US012570302B2

(12) United States Patent
   Okubo

(10) Patent No.: US 12,570,302 B2
(45) Date of Patent: Mar. 10, 2026

(54) VEHICLE TRAVELING ASSISTANCE DEVICE

(71) Applicant: TOYOTA JIDOSHA KABUSHIKI KAISHA, Toyota (JP)

(72) Inventor: Soichi Okubo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/775,187

(22) Filed: Jul. 17, 2024

(65) Prior Publication Data

US 2025/0121841 A1     Apr. 17, 2025

(30) Foreign Application Priority Data

Oct. 17, 2023     (JP) ................................. 2023-178862

(51) Int. Cl.
   *B60W 50/08*     (2020.01)
   *B60W 30/14*     (2006.01)
(52) U.S. Cl.
   CPC ........ *B60W 50/085* (2013.01); *B60W 30/143*
      (2013.01); *B60W 2540/215* (2020.02); *B60W*
      *2555/60* (2020.02); *B60W 2720/10* (2013.01)
(58) Field of Classification Search
   CPC ............ B60W 30/162; B60W 30/146; B60W
      30/143; B60W 50/085; B60W 2540/215;
      B60W 2555/60; B60W 2720/10
   See application file for complete search history.

(56) References Cited

U.S. PATENT DOCUMENTS

| | | | |
|---|---|---|---|
| 8,355,851 | B2 | 1/2013 | Inoue et al. |
| 8,370,040 | B2 | 2/2013 | Inoue et al. |
| 8,417,430 | B2 | 4/2013 | Saeki |
| 8,548,709 | B2 | 10/2013 | Morita |
| 8,768,597 | B2 | 7/2014 | Kagawa |
| 9,174,643 | B2 | 11/2015 | Aso |
| 10,017,178 | B2 | 7/2018 | Morimoto et al. |
| 10,118,617 | B2 | 11/2018 | Urano et al. |
| 10,486,698 | B2 | 11/2019 | Masui et al. |
| 2005/0131614 | A1 | 6/2005 | Isogai et al. |
| 2010/0121526 | A1* | 5/2010 | Pham .................. B60W 30/146 |
| | | | 340/441 |
| 2016/0350606 | A1 | 12/2016 | Yoshitomi et al. |

(Continued)

FOREIGN PATENT DOCUMENTS

| | | |
|---|---|---|
| JP | 2005-193886 A | 7/2005 |
| JP | 5845616 B2 | 1/2016 |

(Continued)

*Primary Examiner* — Peter D Nolan
*Assistant Examiner* — Ce Li Li
(74) *Attorney, Agent, or Firm* — SoraIP, Inc.

(57)     ABSTRACT

The vehicle traveling assistance device proposes a change of the set vehicle speed based on the traveling environment of the own vehicle during execution of the constant speed traveling control for autonomously controlling the traveling of the own vehicle so that the travel speed of the own vehicle is maintained at the set vehicle speed. The vehicle traveling assistance device determines whether or not to make a proposal based on whether or not the set vehicle speed after the change is equal to or higher than a predetermined vehicle speed threshold. The predetermined vehicle speed threshold is set by an operator of the own vehicle.

3 Claims, 3 Drawing Sheets

(56)                    References Cited

U.S. PATENT DOCUMENTS

| | | |
|---|---|---|
| 2019/0295419 A1 | 9/2019 | Tosa et al. |
| 2023/0347893 A1* | 11/2023 | Shirai ................. B60W 30/165 |
| 2024/0227800 A1* | 7/2024 | Spiessl ............... G08G 1/09623 |
| 2024/0375653 A1* | 11/2024 | Selling ................. B60W 30/16 |

FOREIGN PATENT DOCUMENTS

| | | |
|---|---|---|
| JP | 2016-224718 A | 12/2016 |
| JP | 2020-163925 A | 10/2020 |

* cited by examiner

VEHICLE TRAVELING ASSISTANCE DEVICE

CROSS-REFERENCE TO RELATED APPLICATION

This application claims priority to Japanese Patent Application No. 2023-178862 filed on Oct. 17, 2023, incorporated herein by reference in its entirety.

BACKGROUND

1. Technical Field

The disclosure relates to a vehicle traveling assistance device.

2. Description of Related Art

A vehicle traveling assistance device is known which is configured such that, when a speed limit of which an own vehicle is an object is recognized during execution of adaptive cruise control, in which the own vehicle is caused to travel following a preceding vehicle within a range of a travel speed no higher than a set vehicle speed, changing the set vehicle speed to the speed limit that is recognized is proposed to a driver, and when the driver approves the proposal, the set vehicle speed is changed (see Japanese Unexamined Patent Application Publication No. 2020-163925 (JP 2020-163925 A), for example).

SUMMARY

In a situation in which the driver is unlikely to approve the change of the set vehicle speed, proposing the change to the driver will cause the driver to feel irksome due to the unnecessary proposal. Also, there is a possibility that convenience may deteriorate for the driver, such as the driver not being able to perform other operations such as fine adjustment or the like of the set vehicle speed, and so forth, while the change is being proposed.

An object of the disclosure is to provide a vehicle traveling assistance device that is capable of suppressing proposing a change in a set vehicle speed that is unnecessary for an operator of an own vehicle, thereby enabling deterioration in convenience for the operator due to unnecessary proposal of change in the set vehicle speed to be suppressed.

A vehicle traveling assistance device according to the disclosure includes a control device that, based on a travel environment of an own vehicle during execution of a constant speed travel control for autonomously controlling travel of the own vehicle such that a travel speed of the own vehicle is maintained at a set vehicle speed, proposes a change of the set vehicle speed.

The control device is configured to determine whether to make the proposal, based on whether the set vehicle speed after changing will be no lower than a predetermined vehicle speed threshold value.

The predetermined vehicle speed threshold value is set by an operator of the own vehicle.

According to the vehicle traveling assistance device of the disclosure, a predetermined vehicle speed threshold value used for determining whether to make a proposal is set by the operator of the own vehicle. Accordingly, a change in the set vehicle speed that is unnecessary for the operator can be suppressed from being proposed, and thus deterioration in convenience of the operator due to the proposal of the unnecessary change in the set vehicle speed can be suppressed.

Note that in the vehicle traveling assistance device according to the disclosure, the set vehicle speed after changing is a speed limit of which the own vehicle is an object, for example.

According to the vehicle traveling assistance device of the disclosure, whether to make a proposal can be determined based on the speed limit of which the own vehicle is the object.

Further, in the vehicle traveling assistance device according to the disclosure, the control device may be configured to make the proposal when the set vehicle speed after changing will be no lower than the predetermined vehicle speed threshold value, not make the proposal when the set vehicle speed after changing will be lower than the predetermined vehicle speed threshold value, and change the set vehicle speed when the operator approves the proposal when the proposal is made.

According to the vehicle traveling assistance device of the disclosure, the set vehicle speed can be changed while suppressing proposal of change to the set vehicle speed that is unnecessary for the operator.

Further, a vehicle traveling assistance device according to the disclosure includes a control device that, when recognizing a speed limit of which an own vehicle is an object during execution of a constant speed travel control for autonomously controlling travel of the own vehicle such that a travel speed of the own vehicle is maintained at a set vehicle speed, proposes a change of the set vehicle speed to the speed limit.

The control device is configured to make the proposal when the speed limit is no lower than a predetermined vehicle speed threshold value, not make the proposal when the speed limit is lower than the predetermined vehicle speed threshold value, and change the set vehicle speed to the speed limit when an operator of the own vehicle approves the proposal when the proposal is made.

The predetermined vehicle speed threshold value is settable by the operator for each road for which the speed limit is different.

According to the vehicle traveling assistance device of the disclosure, a predetermined vehicle speed threshold value used for determining whether to make a proposal is set by the operator of the own vehicle. Accordingly, a change in the set vehicle speed that is unnecessary for the operator can be suppressed from being proposed, and thus deterioration in convenience of the operator due to the proposal of the unnecessary change in the set vehicle speed can be suppressed.

The components of the disclosure are not limited to the embodiment of the disclosure described later with reference to the drawings. Other objects, other features, and accompanying advantages of the disclosure will be readily understood from the description of the embodiment of the disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
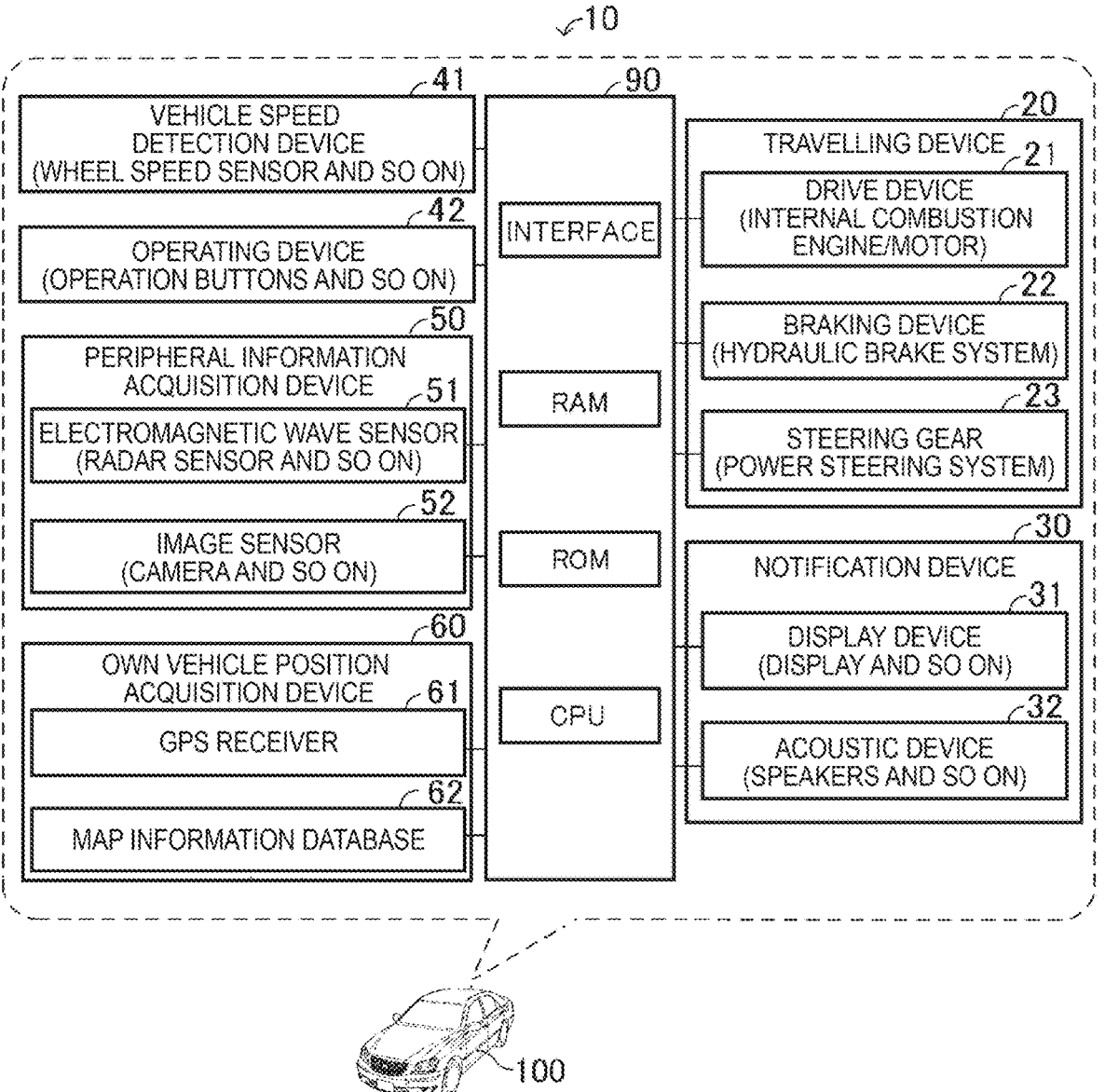
FIG. 1 is a diagram illustrating a vehicle traveling assistance device according to an embodiment of the present disclosure.

Hereinafter, a vehicle traveling assistance device according to an embodiment of the present disclosure will be described with reference to the drawings. FIG. 1 illustrates a vehicle traveling assistance device 10 according to an embodiment of the present disclosure. The vehicle traveling assistance device 10 is mounted on the own vehicle 100. Hereinafter, the vehicle traveling assistance device 10 will be described by taking as an example a case where an operator of the own vehicle 100 is a person who rides on the own vehicle 100 and drives the own vehicle 100 (that is, a driver of the own vehicle 100).

However, the operator of the own vehicle 100 may be a person who drives the own vehicle 100 remotely without getting on the own vehicle 100 (that is, a remote operator of the own vehicle 100). When the operator of the own vehicle 100 is a remote operator, the vehicle traveling assistance device 10 is mounted on the own vehicle 100 and a remote control facility installed outside the own vehicle 100 for remotely driving the own vehicle 100. The functions of the vehicle traveling assistance device 10 described below are shared by the vehicle traveling assistance device 10 mounted on the own vehicle 100 and the vehicle traveling assistance device 10 mounted on the remote control facility.

As illustrated in FIG. 1, the vehicle traveling assistance device 10 includes an electronic control device (ECU) 90 as a control device. The ECU 90 includes a microcomputer as a main part. The microcomputer includes a storage medium such as a CPU, ROM, RAM and a non-volatile memory, an interface, and the like. CPU implements various functions by executing instructions, programs, or routines stored in a storage medium. In particular, in the present example, the vehicle traveling assistance device 10 stores, in a storage medium, a program for realizing various controls executed by the vehicle traveling assistance device 10.

In the present embodiment, the vehicle traveling assistance device 10 includes only one ECU 90, but may include a plurality of ECU so that the functions of the vehicle traveling assistance device 10 described below are shared by the respective ECUs.

Further, the vehicle traveling assistance device 10 may be configured to be able to update a program stored in a storage medium by wireless communication (for example, Internet communication) with an external apparatus.

Further, the own vehicle 100 is equipped with a traveling device 20. The traveling device 20 includes a drive device 21, a braking device 22, and a steering device 23.

The drive device 21 is a device that outputs a driving torque (driving force) applied to the own vehicle 100 in order to cause the own vehicle 100 to travel, and is, for example, an internal combustion engine, a motor, or the like. The drive device 21 is electrically connected to the ECU 90. The vehicle traveling assistance device 10 can control the drive torque output from the drive device 21 by controlling the operation of the drive device 21.

The braking device 22 is a device that outputs a braking torque (braking force) applied to the own vehicle 100 for braking the own vehicle 100, and is, for example, a hydraulic brake device. The braking device 22 is electrically connected to the ECU 90. The vehicle traveling assistance device 10 can control the braking torque output from the braking device 22 by controlling the operation of the braking device 22.

The steering device 23 is a device that outputs a steering torque (steering force) applied to the own vehicle 100 in order to steer the own vehicle 100, and is, for example, a power steering device. The steering device 23 is electrically connected to the ECU 90. The vehicle traveling assistance device 10 can control the steering torque output from the steering device 23 by controlling the operation of the steering device 23.

Further, the own vehicle 100 is equipped with a notification device 30, a vehicle speed detection device 41, an operating device 42, a peripheral information acquisition device 50, and an own vehicle position acquisition device 60.

The notification device 30 is a device that performs various types of notifications to the driver. In the present example, the notification device 30 includes a display device 31 and an acoustic device 32.

The display device 31 is a device that displays various images. The display device 31 includes, for example, a display. The display device 31 is electrically connected to ECU 90.

The acoustic device 32 is a device that outputs various sounds. The acoustic device 32 includes, for example, a speaker. The acoustic device 32 is electrically connected to ECU 90.

The vehicle speed detection device 41 is a device that detects the travel speed of the own vehicle 100. The vehicle speed detection device 41 includes, for example, a wheel speed sensor. The vehicle speed detection device 41 is electrically connected to the ECU 90. The vehicle traveling assistance device 10 acquires the travel speed of the own vehicle 100 as the own vehicle speed V by the vehicle speed detection device 41.

The operating device 42 is a device including a plurality of actuators operated by a driver. The actuator is, for example, an operation button provided on a handle of the own vehicle 100. The actuators are electrically connected to ECU 90.

The peripheral information acquisition device 50 is a device that detects the peripheral information of the own vehicle 100 as the peripheral information IS. In the present example, the peripheral information acquisition device 50 includes an electromagnetic wave sensor 51 and an image sensor 52.

The electromagnetic wave sensor 51 is, for example, an optical sensor such as a radar sensor (millimeter-wave radar or the like), a sound wave sensor such as an ultrasonic sensor (clearance sonar) or a laser radar (LiDAR), and is electrically connected to ECU 90. The vehicle traveling assistance device 10 acquires, by the electromagnetic wave sensor 51, information related to an object existing in the vicinity of the own vehicle 100 (in particular, information related to an object existing in front of the own vehicle 100) as image information that is one of the peripheral information IS.

The image sensor 52 is, for example, a camera, and is electrically connected to ECU 90. The vehicle traveling assistance device 10 acquires information on an image around the own vehicle 100 (in particular, information on an image ahead of the own vehicle 100) by the image sensor 52 as target information which is one of the peripheral information IS.

The own vehicle position acquisition device 60 is a device for acquiring the position and the like of the own vehicle 100. In the present embodiment, the own vehicle position acquisition device 60 includes a global positioning system (GPS) receiver 61 and a map information database 62.

GPS signal receiver 61 is a device that receives a so-called GPS signal, and is electrically connected to ECU 90. The vehicle traveling assistance device 10 can acquire GPS signal via GPS signal receiver 61 and identify (acquire) the position of the own vehicle 100 based on the acquired GPS signal.

The map information database 62 is a database storing map information and is electrically connected to ECU 90. The vehicle traveling assistance device 10 can know which location on the map indicated by the map information is located by the own vehicle 100 based on the position of the own vehicle 100 and the map information specified from GPS signal.

Operation of Vehicle Traveling Assistance Device

Next, the operation of the vehicle traveling assistance device 10 will be described.

The vehicle traveling assistance device 10 executes the following travel control and the constant speed travel control as the autonomous driving control. The driver can request the vehicle traveling assistance device 10 to execute the following travel control by operating an actuator for requesting execution of the following travel control among the actuators of the operating device 42. Further, the driver can request the vehicle traveling assistance device 10 to execute the constant speed travel control by operating an actuator for requesting execution of the constant speed travel control among the actuators of the operating device 42.

Figure 2A:
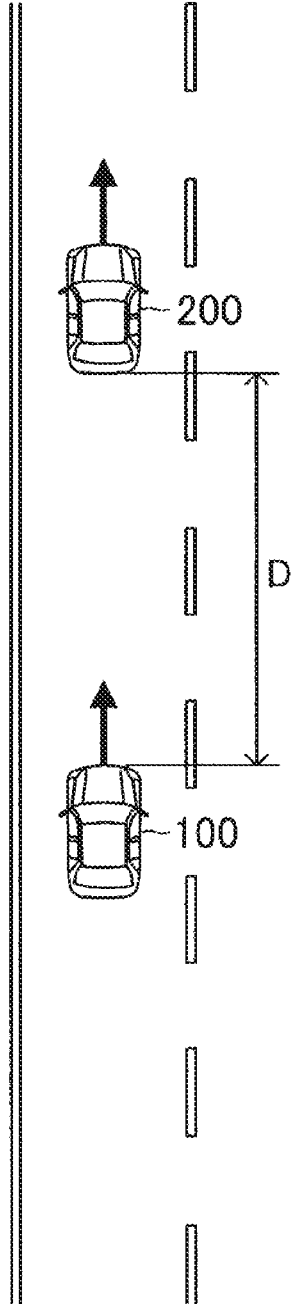
FIG. 2A is a diagram illustrating a scene in which a preceding vehicle is present in front of an own vehicle.

As illustrated in FIG. 2A, the following travel control is a control performed when the preceding vehicle 200 is present in front of the own vehicle 100, and is a control for autonomously controlling the travel of the own vehicle 100 so that the own vehicle 100 travels following the preceding vehicle 200. More specifically, the following travel control is control for autonomously controlling the acceleration and deceleration of the own vehicle 100 by autonomously controlling the operation of the drive device 21 and the braking device 22 so that the inter-vehicle distance D is maintained at the set inter-vehicle distance Dset within a range equal to or less than the set vehicle speed Vset when the preceding vehicle 200 is present in front of the own vehicle 100.

Therefore, when the following travel control is executed, when the inter-vehicle distance D becomes longer than the set inter-vehicle distance Dset, the own vehicle 100 is autonomously accelerated. On the other hand, when the following travel control is executed, when the inter-vehicle distance D becomes shorter than the set inter-vehicle distance Dset, the own vehicle 100 is autonomously decelerated. When the following travel control is executed, when the own vehicle speed V becomes higher than the set vehicle speed Vset, the acceleration/deceleration of the own vehicle 100 is autonomously controlled so that the own vehicle speed V is maintained at the set vehicle speed Vset.

Note that the preceding vehicle 200 is a vehicle that travels forward within a predetermined Dth from the own vehicle 100, and is recognized based on the peripheral information IS (in particular, target information). The inter-vehicle distance D is a distance between the own vehicle 100 and the preceding vehicle 200, and is acquired based on the peripheral information IS (in particular, target information). The set inter-vehicle distance Dset and the set vehicle speed Vset are respectively set by the driver. The driver can set the set inter-vehicle distance Dset and the set vehicle speed Vset by operating an actuator for setting the set inter-vehicle distance Dset and the set vehicle speed Vset, respectively, among the actuators of the operating device 42.

Figure 2B:
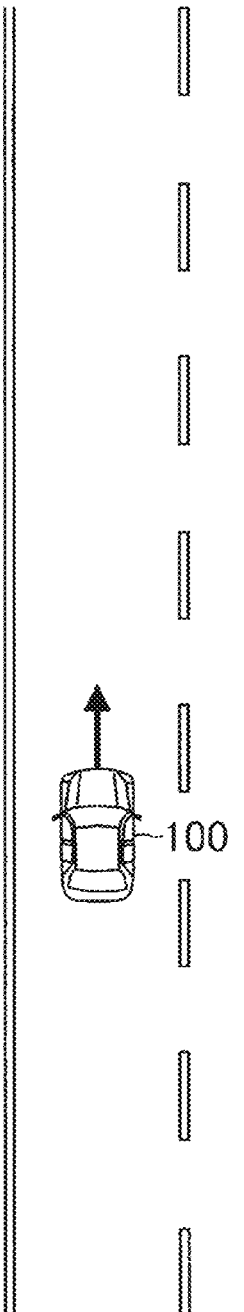
FIG. 2B is a diagram illustrating a scene in which a preceding vehicle is not present in front of the own vehicle.

On the other hand, the constant speed travel control is a control performed when the preceding vehicle 200 does not exist in front of the own vehicle 100 as illustrated in FIG. 2B, and is a control for autonomously controlling the travel of the own vehicle 100 so that the own vehicle speed V is maintained at the set vehicle speed Vset. More specifically, the constant speed travel control is control for autonomously controlling the acceleration and deceleration of the own vehicle 100 by autonomously controlling the operation of the drive device 21 and the braking device 22 so that the own vehicle speed V is maintained at the set vehicle speed Vset when the preceding vehicle 200 is not present in front of the own vehicle 100.

Further, when recognizing the speed limit Vlimit targeted for the own vehicle 100, the vehicle traveling assistance device 10 implements a set vehicle speed change proposal that proposes changing the set vehicle speed Vset to the speed limit Vlimit. When the driver approves the set vehicle speed change proposal, the vehicle traveling assistance device 10 sets the set vehicle speed Vset to the speed limit Vlimit. The vehicle traveling assistance device 10 may be configured to implement a set vehicle speed change proposal that proposes changing the set vehicle speed Vset to a speed smaller than the speed limit Vlimit by a predetermined value. In this case, the predetermined value may be a predetermined value or a value appropriately set by the driver.

Figure 3:
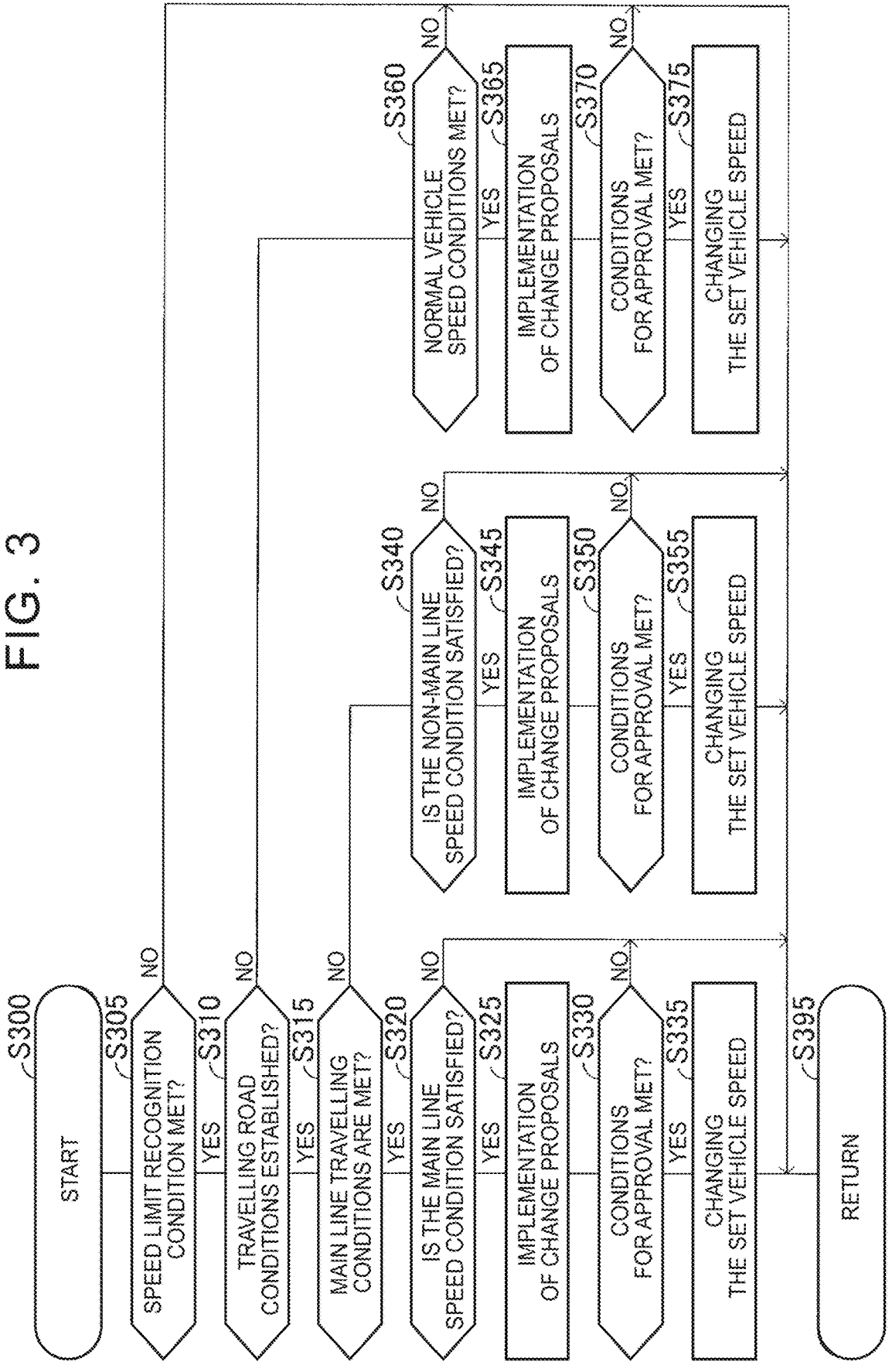
FIG. 3 is a flowchart illustrating a routine executed by the vehicle traveling assistance device according to the embodiment of the present disclosure.

In the present example, the vehicle traveling assistance device 10 executes the routine illustrated in FIG. 3 at predetermined time intervals to implement the set vehicle speed change proposal when the predetermined condition is satisfied. When the driver approves the set vehicle speed change proposal, the vehicle traveling assistance device 10 sets the set vehicle speed Vset to the speed limit Vlimit.

Therefore, at a predetermined timing, the vehicle traveling assistance device 10 starts the processing from S300 of the routine shown in FIG. 3, advances the processing to S305, and determines whether or not the speed limit recognition condition C1 is satisfied. The speed limit recognition condition C1 is a condition that the vehicle traveling assistance device 10 recognizes the speed limit Vlimit targeted at the own vehicle 100.

The vehicle traveling assistance device 10 can acquire the speed-limit Vlimit on the basis of the peripheral information IS. For example, the vehicle traveling assistance device 10 recognizes a traffic sign installed on a road on which the own vehicle 100 is traveling, the traffic sign appearing in an image acquired by the image sensor 52, based on the image information, and recognizes a speed limit Vlimit from the traffic sign. Alternatively, when the information on the speed limit Vlimit is stored in the map information database 62, the vehicle traveling assistance device 10 recognizes the speed limit Vlimit targeted to the own vehicle 100 from the map information database 62 based on the position of the own vehicle 100 acquired based on GPS signal.

When determining "Yes" in S305, the vehicle traveling assistance device 10 advances the process to S310 and determines whether or not the traveling road condition C2 is satisfied. In the present embodiment, the traveling road condition C2 is a condition that the own vehicle 100 is traveling on an automobile dedicated road such as an expressway. For example, the vehicle traveling assistance device 10 determines whether or not the traveling road condition C2 is satisfied based on the position of the own vehicle 100 acquired based on GPS and the map information stored in the map information database 62.

When determining "Yes" in S310, the vehicle traveling assistance device 10 advances the process to S315 and determines whether or not the main line traveling condition C3 is satisfied. In the present embodiment, the main line traveling condition C3 is a condition that the own vehicle 100 is traveling on the main line of the automobile dedicated road. For example, the vehicle traveling assistance device 10 determines whether or not the main line traveling condition C3 is satisfied based on the position of the own vehicle 100 acquired based on GPS signal and the map information stored in the map information database 62.

When determining "Yes" in S315, the vehicle traveling assistance device 10 advances the process to S320 and determines whether or not the main line speed condition C11 is satisfied. In the present embodiment, the main line speed condition C11 is a condition that the currently recognized speed limit Vlimit is equal to or higher than the main line speed threshold V11. The driver can appropriately set the main line speed threshold V11 using the operating device 42.

When S320 determines "Yes", the vehicle traveling assistance device 10 advances the process to S325 and implements the set vehicle speed change proposal. In this example, the notification device 30 proposes a change of the set vehicle speed to the driver. More specifically, the set vehicle speed change proposal is made by displaying, by the display device 31, images suggesting setting the set vehicle speed Vset to the currently recognized speed limit Vlimit. The set vehicle speed change proposal is made by outputting, from the acoustic device 32, a sound suggesting setting the set vehicle speed Vset to the currently recognized speed limit Vlimit.

Next, the vehicle traveling assistance device 10 advances the process to S330, and determines whether or not the approval condition C4 is satisfied. The approval condition C4 is a condition that the driver approves setting the set vehicle speed Vset to the currently recognized speed limit Vlimit. In the present embodiment, the approval condition C4 is a condition that, among the actuators of the operating device 42, the actuator for approving the setting of the set vehicle speed Vset to the currently recognized speed limit Vlimit is operated.

When S330 determines "Yes", the vehicle traveling assistance device 10 advances the process to S335 and changes (sets) the set vehicle speed Vset to the currently recognized speed limit Vlimit. After that, the vehicle traveling assistance device 10 advances the processing to S395, and ends the processing of the routine once.

On the other hand, when S330 determines "No", the vehicle traveling assistance device 10 directly advances the processing to S395, and ends the processing of this routine once. In this situation, the vehicle traveling assistance device 10 does not change the set vehicle speed Vset.

When S320 determines "No", the vehicle traveling assistance device 10 directly advances the processing to S395 and ends the processing of this routine once. In this case, the vehicle traveling assistance device 10 does not make a set vehicle speed change proposal.

When S315 determines "No", the vehicle traveling assistance device 10 advances the process to S340 and determines whether or not the non-main line speed condition C12 is satisfied. In the present embodiment, the non-main line speed condition C12 is a condition that the currently recognized speed limit Vlimit is equal to or higher than the non-main line speed threshold V12. The driver can appropriately set the non-main line speed threshold V12 using the operating device 42.

When S340 determines "Yes", the vehicle traveling assistance device 10 advances the process to S345 and implements the set vehicle speed change proposal.

Next, the vehicle traveling assistance device 10 advances the process to S350, and determines whether or not the approval condition C4 is satisfied.

When determining "Yes" in S350, the vehicle traveling assistance device 10 advances the process to S355 and sets the set vehicle speed Vset to the currently recognized speed limit Vlimit. After that, the vehicle traveling assistance device 10 advances the processing to S395, and ends the processing of the routine once.

On the other hand, when S350 determines "No", the vehicle traveling assistance device 10 directly advances the processing to S395, and ends the processing of this routine once. In this situation, the vehicle traveling assistance device 10 does not change the set vehicle speed Vset.

When S340 determines "No", the vehicle traveling assistance device 10 directly advances the processing to S395 and ends the processing of this routine once. In this case, the vehicle traveling assistance device 10 does not make a set vehicle speed change proposal.

When S310 determines "No", the vehicle traveling assistance device 10 advances the process to S360 and determines whether or not the normal vehicle speed condition C13 is satisfied. In the present embodiment, the normal vehicle speed condition C13 is a condition that the currently recognized speed limit Vlimit is equal to or greater than the normal speed threshold V13. The driver can appropriately set the normal speed threshold V13 using the operating device 42.

The upper limit value of the value that can be set as the normal speed threshold V13 is smaller than the upper limit value of the value that can be set as the main line speed threshold V11 and the non-main line speed threshold V12.

When S360 determines "Yes", the vehicle traveling assistance device 10 advances the process to S365 and implements the set vehicle speed change proposal.

Next, the vehicle traveling assistance device 10 advances the process to S370, and determines whether or not the approval condition C4 is satisfied.

When determining "Yes" in S370, the vehicle traveling assistance device 10 advances the process to S375 and sets the set vehicle speed Vset to the currently recognized speed limit Vlimit. After that, the vehicle traveling assistance device 10 advances the processing to S395, and ends the processing of the routine once.

On the other hand, when S370 determines "No", the vehicle traveling assistance device 10 directly advances the processing to S395, and ends the processing of this routine once. In this situation, the vehicle traveling assistance device 10 does not change the set vehicle speed Vset.

When S360 determines "No", the vehicle traveling assistance device 10 directly advances the processing to S395 and ends the processing of this routine once. In this case, the vehicle traveling assistance device 10 does not make a set vehicle speed change proposal.

Further, when S305 determines "No", the vehicle traveling assistance device 10 directly advances the processing to S395, and ends the processing of this routine once.

The above is the operation of the vehicle traveling assistance device 10.

According to the vehicle traveling assistance device 10, when the speed limit Vlimit recognized when the own vehicle 100 is traveling on the main line of the vehicle dedicated road is lower than the main line speed threshold V11, the set vehicle speed change proposal is not made. Here, the main line speed threshold V11 is a threshold set by the driver. Similarly, if the speed limit Vlimit recognized when the own vehicle 100 is traveling on the automobile dedicated road but travels on a lane other than the main lane (for example, a junction of the automobile dedicated road or the like) is lower than the non-main line speed threshold V12, the set vehicle speed change proposal is not made. Here, the non-main line speed threshold V12 is a threshold set by the driver. Similarly, if the speed limit Vlimit recognized when the own vehicle 100 is traveling on a road other than the automobile dedicated road (for example, a general road, etc.) is lower than the normal speed threshold V13, the set vehicle speed change proposal is not made. Here, the normal speed threshold V13 is a threshold set by the driver.

That is, the vehicle traveling assistance device 10 includes a control device (ECU 90) that proposes a change of the set vehicle speed Vset based on the traveling environment of the own vehicle 100 while executing the constant speed traveling control that autonomously controls the traveling of the own vehicle 100 so that the travel speed (own vehicle speed V) of the own vehicle 100 is maintained at the set vehicle speed Vset. The traveling environment of the own vehicle 100 is an environment in which the own vehicle 100 travels on the main line of the vehicle dedicated road, an environment in which the own vehicle 100 travels on the vehicle dedicated road but travels other than the main line, and an environment in which the own vehicle 100 travels on a general road. The control device is configured to determine whether or not to make the above proposal based on whether or not the changed set vehicle speed (the speed limit Vlimit) is equal to or greater than a predetermined vehicle speed threshold (the main line speed threshold V11, the non-main line speed threshold V12, and the normal speed threshold V13). The predetermined vehicle speed threshold value is set by an operator (driver) of the own vehicle 100.

More specifically, the vehicle traveling assistance device 10 includes a control device (ECU 90) that makes a proposal (setting vehicle speed change proposal) for changing the set vehicle speed Vset to the speed limit Vlimit when the speed limit Vlimit targeted for the own vehicle 100 is recognized during the constant speed travel control for autonomously controlling the travel of the own vehicle 100 so that the travel speed (own vehicle speed V) of the own vehicle 100 is maintained at the set vehicle speed Vset. Then, when the speed limit Vlimit is equal to or higher than the predetermined vehicle speed threshold (the main line speed threshold V11, the non-main line speed threshold V12, and the normal speed threshold V13), the control device makes the above proposal. If the speed limit Vlimit is lower than the predetermined vehicle speed threshold, the above proposal is not made. When the above proposal is made and the operator (driver) of the own vehicle 100 approves the proposal, the set vehicle speed Vset is changed to the speed limit Vlimit. The predetermined vehicle speed thresholds can be set by the operator (driver) of the own vehicle 100 for each road where the speed limit Vlimit differs.

As described above, according to the vehicle traveling assistance device 10, the driver sets the predetermined vehicle speed threshold used for determining whether or not to make the set vehicle speed change proposal. Therefore, it is possible to suppress proposal of change of the set vehicle speed unnecessary for the driver, and thereby it is possible to suppress deterioration of convenience of the driver due to proposal of change of the unnecessary set vehicle speed.

The present disclosure is not limited to the above embodiment, and various modifications can be adopted within the scope of the present disclosure.

For example, the vehicle traveling assistance device 10 may be configured to make the set vehicle speed change proposal when the predetermined condition is satisfied only when the driver is requested to make the set vehicle speed change proposal when the predetermined condition is satisfied. In this case, the operating device 42 is configured so that the driver can request that the set vehicle speed change proposal be made when a predetermined condition is satisfied by using the operating device 42.

What is claimed is:

1. A vehicle traveling assistance device mounted on a vehicle, the vehicle including a wheel speed sensor configured to detect a travel speed value of the vehicle, a camera configured to take images around the vehicle, a position acquisition device configured to acquire a position of the vehicle and having a global positioning system receiver and a map information database, and a display device, the vehicle traveling assistance device comprising a processor configured to:

determine whether a traffic sign appears in an image acquired by the camera, the traffic sign being installed on a road on which the vehicle is traveling, recognize a limit speed value from the acquired image in response to the determination that the traffic sign appears in the acquired image, determine whether the vehicle is traveling on a main line of an expressway, a junction of the expressway, or a normal road based on the position of the vehicle acquired by the position acquisition device, compare the recognized limit speed value with a first speed threshold corresponding to the main line of the expressway in response to the determination that the vehicle is traveling on the main line of the expressway, cause the display device to display a proposal image that proposes changing a setting speed value for an autonomous driving of the vehicle to the recognized limit speed value in a case where the recognized limit speed value is equal to or larger than the first speed threshold, the autonomous driving controlling travel of the vehicle such that the travel speed value of the vehicle is maintained at the setting speed value, cause the display device not to display the proposal image in a case where the recognized limit speed value is less than the first speed threshold, compare the recognized limit speed value with a second speed threshold corresponding to the junction of the expressway in response to the determination that the vehicle is traveling on the junction of the expressway, cause the display device to display the proposal image in a case where the recognized limit speed value is equal to or larger than the second speed threshold, cause the display device not to display the proposal image in a case where the recognized limit speed value is less than the second speed threshold, compare the recognized limit speed value with a third speed threshold corresponding to the normal road in response to the determination that the vehicle is traveling on the normal road, cause the display device to display the proposal image in a case where the recognized limit speed value is equal to or larger than the third speed threshold, and cause the display device not to display the proposal image in a case where the recognized limit speed value is less than the third speed threshold.

2. The vehicle traveling assistance device according to claim 1, wherein an upper limit value of the third speed threshold is smaller than an upper limit value of the second speed threshold.

3. The vehicle traveling assistance device according to claim 1, wherein an upper limit value of the third speed threshold is smaller than an upper limit value of the first speed threshold.

\* \* \* \* \*